United States Patent [19]

Osborn

[11] Patent Number: 4,682,447
[45] Date of Patent: Jul. 28, 1987

[54] LIGHTWEIGHT TARPAULIN

[75] Inventor: Paul V. Osborn, Webster, N.Y.

[73] Assignee: Mobil Oil Corporation, New York, N.Y.

[21] Appl. No.: 815,975

[22] Filed: Jan. 3, 1986

Related U.S. Application Data

[63] Continuation-in-part of Ser. No. 640,714, Aug. 14, 1984, Pat. No. 4,580,372.

[51] Int. Cl.⁴ .................. E04B 1/34; E04B 1/345; A43C 5/00; B65D 55/00
[52] U.S. Cl. ........................................ 52/3; 16/2; 24/142; 135/119; 150/52 R
[58] Field of Search ............ 52/3; 16/2; 135/119, 135/115; 150/52 R; 24/141, 142

[56] References Cited

U.S. PATENT DOCUMENTS

| | | |
|---|---|---|
| 19,689 | 3/1858 | Dinsmoor . |
| 38,871 | 6/1863 | Dennison .................. 24/141 X |
| 84,453 | 11/1868 | Whitney . |
| 1,784,115 | 12/1930 | Sebell . |
| 1,871,101 | 8/1932 | Waltz . |
| 1,871,570 | 8/1932 | Weber . |
| 1,871,571 | 8/1932 | Weber . |
| 2,401,997 | 6/1946 | Whitman .................. 24/141 X |
| 2,748,047 | 5/1956 | Kuss ........................ 24/142 X |
| 2,821,764 | 2/1958 | Leahy et al. . |
| 3,162,920 | 12/1964 | Durham . |
| 3,225,408 | 12/1965 | Durham . |
| 3,467,351 | 9/1969 | Feuerer . |
| 3,802,027 | 4/1974 | Mueller . |
| 3,862,876 | 1/1975 | Graves . |
| 3,987,592 | 10/1976 | Herminghaus et al. ........ 135/115 X |
| 4,257,200 | 3/1981 | Hensley et al. . |

FOREIGN PATENT DOCUMENTS 782709 9/1957 United Kingdom .................. 150/52

Primary Examiner—Alfred C. Perham
Attorney, Agent, or Firm—Alexander J. McKillop; Michael G. Gilman; Charles J. Speciale

[57] ABSTRACT

A tarpaulin incorporating a novel and structure which will enable the tarpaulin to be readily utilized as an outdoor cover, drop cloth, lawn cleanup sheet and numerous other applications even under relatively adverse environmental conditions. The tarpaulin is preferably constituted of a fiber-reinforced thermoplastic film material, which incorporates corner or edge grommet structure; which enables staking or weighted components to be detachably fastened to the structure so as to ensure that the tarpaulins will not be displaced or carried off in response to extraneous forces caused by the elements, while concurrently allowing for the easy handling thereof during use, particularly when employed for outdoor purposes, such as the accumulation and removal of lawn trash constituted of leaves, grass or shrubbery cuttings and the like.

5 Claims, 7 Drawing Figures

LIGHTWEIGHT TARPAULIN

CROSS-REFERENCE TO RELATED PATENT APPLICATIONS

This application is a continuation-in-part patent application of Ser. No. 640,714; filed Aug. 14, 1984 now Pat. No. 4,580,372.

BACKGROUND OF THE INVENTION

1. Field of the Invention

The present invention relates to a lightweight fiber-reinforced tarpaulin or cover sheet which is adapted to be draped over an object or superimposed on a surface area, and more specifically, relates to a tarpaulin incorporating a novel grommet structure, adapted when desired to receive a weighting or staking device, which will enable the tarpaulin to be readily utilized as an outdoor cover, drop cloth, lawn cleanup sheet and numerous other applications even under relatively adverse environmental conditions.

Tarpaulins or cover cloths are widely employed for diverse purposes, both indoors and outdoors, for the covering of various objects or surfaces. In particular, although not limited thereto, tarpaulins are frequently employed as both indoor and outdoor coverings for furnishings such as lawn and patio furniture and barbecues, as drop cloths for painting, and also as cleaning sheets for the accumulation and the removal of lawn trash such as leaves, grass and shrubbery cuttings or the like. Additionally, tarpaulins have found widespread use in the covering of luggage being transported on the roof of motor vehicles, and can also be employed as outdoor tablecloths, picnics or beach blankets.

Frequently, especially when used for outdoor applications, tarpaulins are constructed of a generally water-repellant canvas material which is rather heavy and difficult to maneuver, and is not completely moisture-impervious while also being difficult to clean. More recently, in lieu of canvas tarpaulins, plastic sheeting has come into extensive use, in which the plastic material is generally stronger and more tear-resistant than canvas, and is also lighter in weight and moisture-impervious. However, the lightweight construction of plastic sheeting, especially when used outdoors, necessitates that these incorporate weighted components which will prevent them from being disarranged or carried out by the wind or other extraneous forces imposed therein by the elements. Often this necessitates that the tarpaulins or cover sheets incorporate grommets which enable the edges or corners of the tarpaulins to be anchored down to ground through the intermediary of stakes or other weighted objects, and at times provide gripping components to facilitate the carrying of the tarpaulins. Occasionally, old tablecloths, rather than being discarded, are employed as tarpaulins or drop cloths. However, such old tablecloths are frequently rather unsightly, cannot be easily cleaned and absorb moisture so as to thereby restrict their use to only specific applications.

In order to eliminate the limitations and shortcomings encountered in currently available tarpaulins, irrespective as to whether these are constituted of canvas material, cloth or plastic sheeting, the present invention contemplates the provision of a unique and strong lightweight tarpaulin, which is inexpensive, and which is preferably constituted of a fiber-reinforced thermoplastic film material, which incorporates corner or edge grommet structure fastened to the film material, and which may be staked or weighted so as to ensure that the tarpaulins will not be displaced or carried off in response to extraneous forces caused by the elements, while concurrently allowing for the easy handling thereof during use, particularly when employed for outdoor purposes, such as the accumulation and removal of lawn trash constituted of leaves, grass or shrubbery cuttings and the like.

2. Discussion of the Prior Art

Currently, many patent publications disclose and describe various types of dropcloths or tarpaulins which may be employed for numerous indoor and outdoor applications.

Thus, Dinsmore U.S. Pat. No. 19,689 discloses a tarpaulin or canvas cover sheet which is adapted to be superimposed on a haystack to protect the latter from rain. The edges of the sheet incorporate shrinkable elastic ground connections which may have pins attached thereto so as to enable the latter to be driven into the ground and to retain the tarpaulin in position irrespective of the application of extraneous forces, such as wind. Cover sheets of that type, however, are extremely heavy and cumbersome, and only suitable for limited outdoor use, while not being readily maneuverable by a user.

Witney U.S. Pat. No. 84,453 discloses a hay cap or cover sheet having edges which are turned over to provide reinforcements, and having eyelets formed therein to allow for the insertion therethrough of anchoring members and ropes to retain the cover sheet or tarpaulin on a hay stack.

Duram U.S. Pat. No. 3,162,920 discloses a weather cover or sheet structure wherein the edges thereof include strips or lashes projecting therefrom, and incorporating grommets which are adapted to provide connecting for ropes leading to ground anchoring stakes or pins.

Waltz U.S. Pat. No. 1,871,101 discloses a tarpaulin which includes edge and corner grommets and eyelets adapted to be engaged by suitable fasteners, such as rope or the like, for tying the tarpaulin about an object, or anchoring the tarpaulin to the ground, with the tarpaulin structure being constituted of a relatively heavy canvas material. A similar type of structure is disclosed in Weber U.S. Pat. No. 1,871,571 wherein the reinforced edge portions of a canvas tarpaulin incorporate grommets adapted to form eyelets for the insertion therethrough of suitable anchoring components, such as rope or the like.

Leahy, et al. U.S. Pat. No. 2,821,764 discloses a method and structure for attaching grommets of a thermoplastic material to flexible sheet material in which a series of small holes encompass a central aperture, and in which the grommet material is molded in the sheet material such that the grommet material flows through the small holes and forms an attachment for the grommet portions on both sides of the flexible sheet material.

Mueller U.S. Pat. No. 3,802,027 discloses a plastic closure bushing constituted of a threaded member which may be inserted into the opening of a container wall. However, this type of structure is not readily applicable to a cover sheet or tarpaulin in a manner analogous to that provided for by the present invention.

Graves U.S. Pat. No. 3,862,876 discloses a weighted cover cloth or tarpaulin in which weighting material may be incorporated in the edge regions of the tarpaulin, such weighting material preferably being constituted of sand or other particulate material, and which is adapted to prevent the disarray of the covering by extraneous forces, such as people walking therein, vehicles, wind or the like. In this instance, the weighted material forms an integral and permanent component of the protective cover cloth, thereby rendering its use limited due to the heavy weight of the cover cloth or tarpaulin resulting therefrom.

Other types of tarpaulins or cover cloths which incorporate various kinds of anchoring devices, such as eyelets, grommets, lashes, slings or the like, are disclosed in Durham U.S. Pat. Nos. 3,225,408; Hensley et al. 4,257,200; Weber 1,871,570; Sebell 1,784,115; and Feuerer 3,467,351.

SUMMARY OF THE INVENTION

In essence, it is an object of the present invention to provide a strong, lightweight tarpaulin construction in which a fiber-reinforced thermoplastic film sheet incorporates grommets adhesively bonded to one surface of the film sheet adjacent the corners or edges thereof, and in which the grommets include circular central openings or eyelets which are in alignment with apertures provided in the film sheet at predetermined locations therein.

When desired, the central openings or eyelets of the grommets are adapted to each engage a suitable staking or typing element, or to each threadingly receive a component in the form of a sealable container which may be filled with a suitable weighting material, such as sand or water, and wherein each container is preferably imparted the configuration of a handle-like member to facilitate the handling and movement of the tarpaulin by one or more users, and to thereby enable the tarpaulin to resist inadvertent displacement by extraneous forces due to the elements.

Furthermore, the structure of the inventive tarpaulin and grommet structure; and when desired the utilization of detachable container for the weighted material, which permits for the ready detaching and emptying of such containers, thereby rendering the handling weight and manipulation of the tarpaulin even lighter, while concurrently enabling the tarpaulin body portion itself to be employed for a multiplicity of both indoor and outdoor uses, renders the manufacture thereof economical and inexpensive.

In accordance with one embodiment, the inventive tarpaulin may be equipped with readily attachable and removable hollow containers which are essentially wedge-shaped in configuration, and which each include an externally threaded filling neck portion adapted to be threadingly engaged into the central opening of an associated grommet on the tarpaulin, with the container then being filled with a suitable weighting material, such as sand or water, and thereafter sealed by means of a closure cap having an internal thread engaging the external thread on the neck portion so as to seal in the container contents while concurrently retaining the wedge-shaped container fastened to the grommet in the tarpaulin. Preferably, each wedge-shaped container is constituted of a blow-molded thermoplastic material, such as a rigid high-density polyethylene, and has an elongated opening molded therein to provide for the insertion therethrough of the fingers of a user, to enable the latter to manipulate the tarpaulin and effect the raising thereof. This then affords the dual function of causing each container to constitute a weighting member for holding down of the tarpaulin corners or edges, and to concurrently provide gripping structure for the raising and manipulating of the tarpaulin as required by a user.

BRIEF DESCRIPTION OF THE DRAWINGS

Reference may now be had to the following detailed description of exemplary embodiments of a tarpaulin which is constructed pursuant to the invention, taken in conjunction with the accompanying drawings; in which.

DETAILED DESCRIPTION

Figure 1:
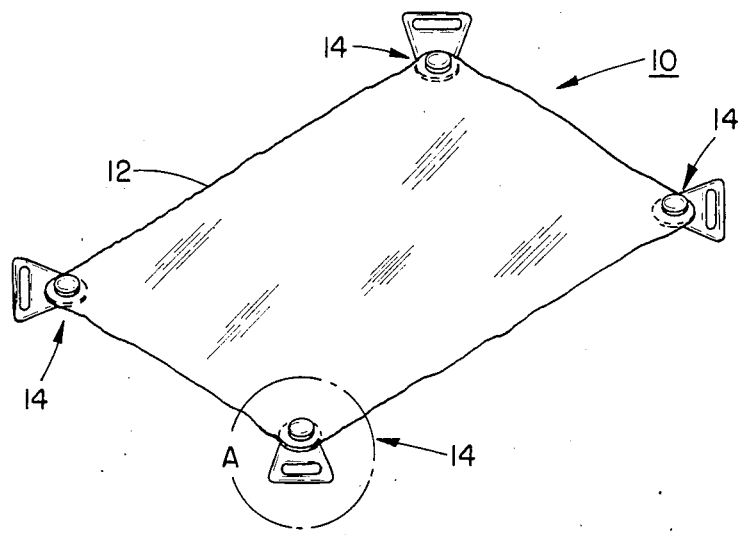
FIG. 1 illustrates a perspective view of a first embodiment of a tarpaulin incorporating the inventive grommets, and with detachable weighting structure attached thereto pursuant to the invention.
Figure 2:
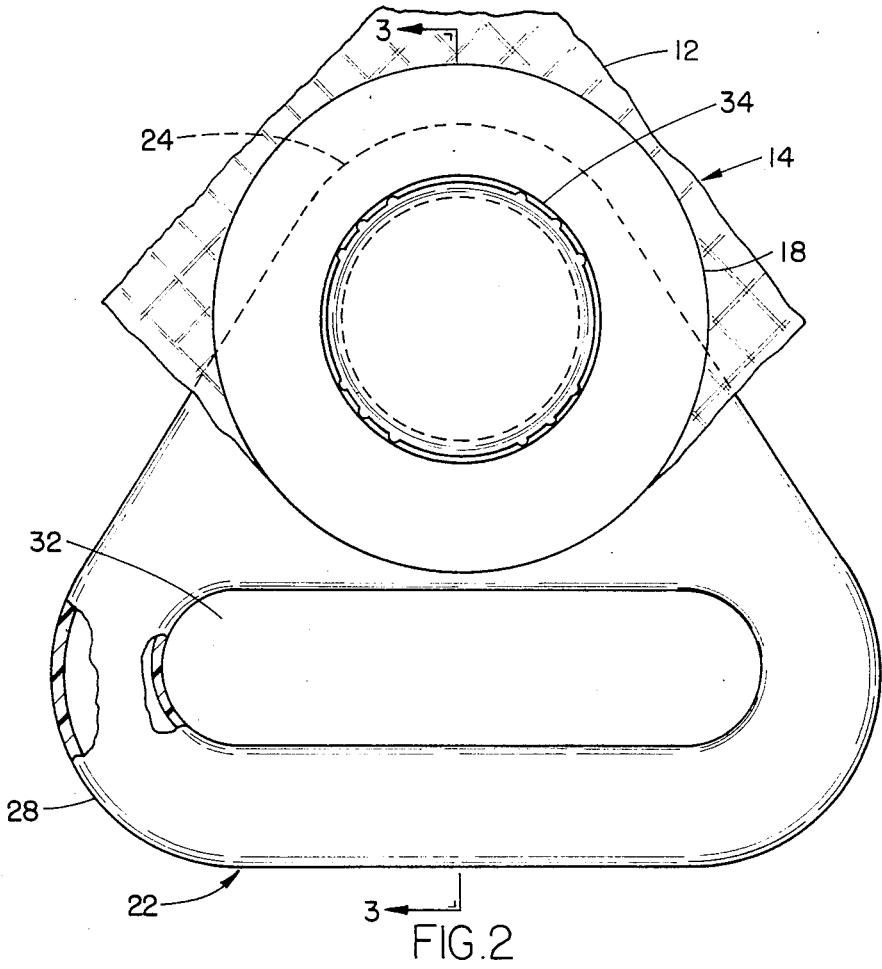
FIG. 2 is a plan view, on an enlarged scale, of a corner portion of the inventive tarpaulin, as illustrated in the encircled portion A in FIG. 1.
Figure 3:
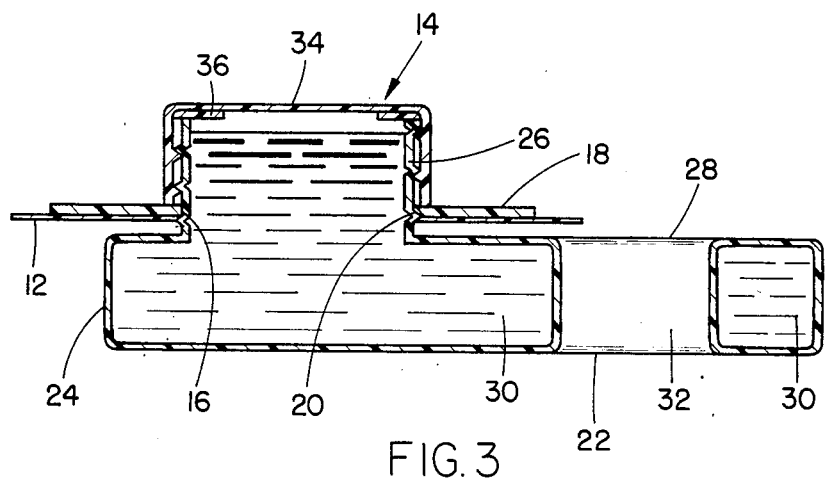
FIG. 3 illustrates a sectional view taken along line 3—3 in FIG. 2, shown rotated through an angle of 90°.

Referring now in detail to the embodiment of the invention as illustrated in FIGS. 1 to 3 of the drawings, in FIG. 1 there is shown a first embodiment of a tarpaulin structure 10. The tarpaulin structure 10 includes a parallelipiped tarpaulin body or sheet portion 12 which, in a preferred case, may be constituted of a fiber-reinforced thermoplastic sheet material, such as a polyethylene film, preferably, although not necessarily, having a thickness of about 3 mil.

Provided at least each of the corners of the tarpaulin body portion 12 are the inventive grommet and weighting arrangements 14, as detailed in the enlarged scale views of FIGS. 2 and 3 and described hereinbelow.

Referring in particular to FIGS. 2 and 3 of the drawings, the tarpaulin sheet or body portion 12 includes, at each corner thereof, a through-aperture 16 of generally circular configuration which, in this embodiment, may be approximately 1½ inches in diameter, and which has disc-shaped grommet 18 adhesively fastened to one surface, preferably the lower surface, of the sheet 12. Each grommet 18 is constituted of a circular flat disc, for example, possessing a 3-inch outer diameter, and which includes a circular central aperture 20 of about 1½ inches in diameter in conformance with and superposition with the aperture 16 which is formed in the sheet 12. The grommet 18 may be constituted of a generally rigid high-density polyethylene and, in this embodiment, has a thickness of approximately 1/16 inch. The grommet is adhesively fastened to the sheet 12, preferably through heat sealing, as is well known in the plastics technology.

Adapted to extend through each aperture 16 in the sheet 12 and the superimposed aperture 20 of the grommet 18, is an inventive tarpaulin weighting attachment or container 22. Each container 22 is essentially constituted of a hollow blow-molded and substantially rigid high-density polyethylene which, in the illustrated embodiment, has a generally wedge-shaped configuration, with the one apex region 24 thereof having an externally-threaded cylindrical neck portion 26 integrally molded into one surface 28 of the container so as to project laterally therefrom. The wedge-shaped container 22 has a completely enclosed inner space 30 communicating with the cylindrical neck portion 26, and has an elongated opening 32 molded therein so as to enable the insertion therethrough of the fingers of a user.

A closure cap 34, preferably of molded HDPE, has an internal screw-threaded portion adapted to threadingly engage with the external screw threads on the neck 26 of the container 22, and which cap also includes an internal annular sealing gasket 36 adapted to be sealingly contact the open end of the neck portion 26 upon the latter being threaded onto the inner diameter or aperture 20 of the grommet 18. Prior to the closure cap 34 being screwed onto the neck portion 26 of the container 22, the latter is filled with a suitable weighting material, which may consist of either sand or water. Thereafter, the closure cap 34 is screwed onto the cylindrical neck portion 26 until the gasket 36 forms a sealing engagement with the end or the opening of the neck portion 26, thus sealing the liquid or particulate contents of the container 22 into its interior space 30.

If desired, as shown in this embodiment, each of the four corners of the rectangular sheet 12 may be provided with a container arrangement 22 so as to allow for the weighting of the sheet or tarpaulin 10 at each of its corners. In the illustrated arrangement, each of the containers 22 and its internal spatial volume may be dimensioned such that, when filled with water, it will weigh about ½ pound, whereas when filled with sand it will weigh about ¾ pound.

A preferred size of the sheet 12 which is applicable as a dropcloth or lawn tarp may be 66 inches by 84 inches, although other tarpaulin sizes readily lend themselves to the present invention in dependence upon their intended uses.

Figure 4:
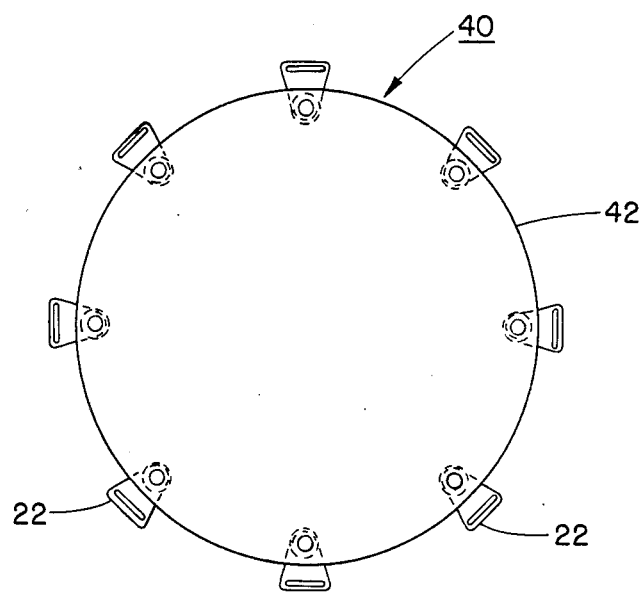
FIG. 4 illustrates a top plan view of a modified embodiment of the inventive tarpaulin.

In the embodiment illustrated in FIG. 4 of the drawings, the tarpaulin arrangement 40 contemplates the use of a circular sheet 42 having a plurality, in this instance, eight container units 22 arranged equidistantly spaced about its circumference. In this instance, the circular configuration of the tarpaulin sheet 42 is adapted to be utilized, for example, as a picnic tablecloth or ground sheet, although many other uses may be readily contemplated.

Figure 5:
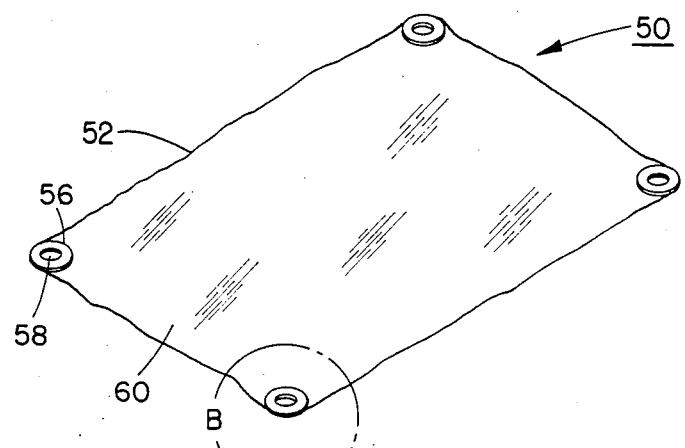
FIG. 5 illustrates a third, preferred embodiment of a tarpaulin incorporating the inventive grommets, shown in a perspective view.
Figure 6:
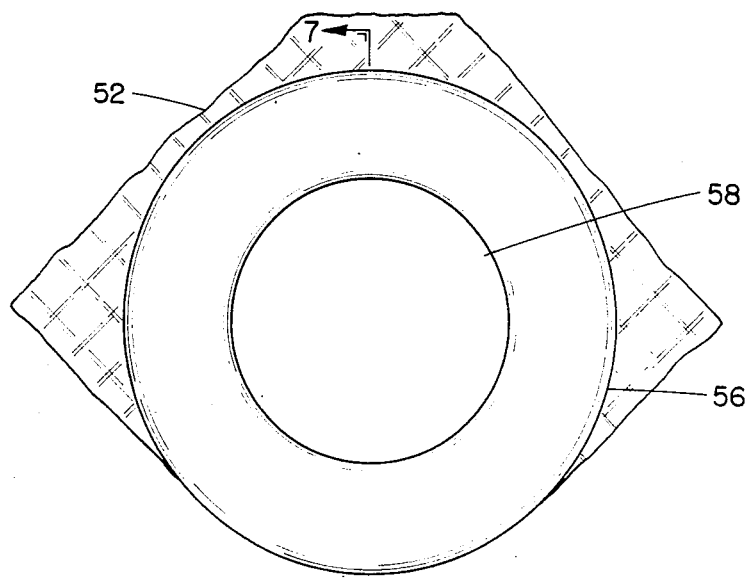
FIG. 6 is a plan view, on an enlarged scale, of a corner portion of the tarpaulin, as illustrated in the encircled portion B in FIG. 5.
Figure 7:
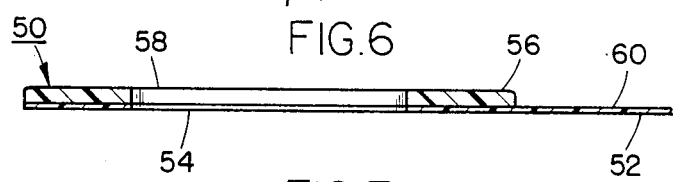
FIG. 7 illustrates a sectional view taken along line 7—7 in FIG. 6.

Referring to the preferred embodiment illustrated in FIGS. 5 through 7 of the drawings, in which similar or identical elements to those shown in the preceding embodiments are identified by the same reference numerals, the tarpaulin structure 50 is constituted of a generally rectangular sheet 52 which, as in the preceding embodiments, is formed from a fiber-reinforced thermoplastic sheet material, such as polyethylene film, which preferably although not necessarily has a thickness of about 3 mil.

Formed in at least of each of the corners of the sheet 12 are suitable through apertures 54, which are of essentially circular configuration and are about 1½ inches in diameter.

Fastened to at least one surface of the sheet 52, in superposition with each aperture 54 is a generally circularly flat disc-shaped grommet 56, each grommet having a central opening 58 therein of a size commensurate with that of the aperture 54 in the sheet 52. In essence, each central opening in the grommet 56 has a diameter of approximately 1½ inches.

Each grommet 56 is formed of a generally rigid thermoplastic plate structure, having an outer circular diameter of approximately 3 inches, and a thickness of approximately 1/16 inch, although if desired, for certain applications heavier thicknesses and diameters may be desirable.

Each grommet 56 is adhesively fastened to the contacting surface 60 on the sheet 52 through either the use of a suitable adhesive or, preferably, being heat sealed thereto, as is known in the plastics technology. This will provide an extremely simple and high-strength structure which can be inexpensively manufactured.

Although the embodiment of the tarpaulin 50 disclosed in FIGS. 5 through 7 is illustrated herein as a rectangular sheet 52 having the grommets 56 positioned adjacent each corner thereof, it will be readily apparent to one skilled in the art to other configurations, such as a round sheet, analogous to that shown in FIG. 4, and may also be provided, in which a larger number of grommets 58 are arranged about the circumference in such a circular plastic sheet.

The particular configuration of the containers is only illustrative, and it is also possible to contemplate that, in lieu of the wedge-shaped container, there may be employed disc-like or bottle shaped containers having threaded neck portions adapted to extend through the central aperture in each of the grommets, and with the containers thereafter being filled with weighting material and sealed through suitable closure structure in a manner analogous to that as described hereinabove.

From the foregoing it clearly appears that the invention provides for a versatile tarpaulin construction which is adapted for numerous uses both indoors and outdoors, and which is of a strong lightweight material and relatively inexpensive to product, while concurrently lending itself to being manufactured in different attractive colors and/or decorative patterns having a broad aesthetic appeal.

While there has been shown and described what are considered to be preferred embodiments of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. A lightweight tarpaulin for superposition over an object or on a surface area, said tarpaulin comprising:
   (a) a tarpualin body portion of a flexible sheet material constituted essentially of a fiber-reinforced polyethylene film, said sheet material having a plurality of apertures formed therein and spaced along the periphery of said body portion; and
   (b) a plurality of flat, disc-shaped plastic grommets each constituted of a rigid high-density polyethylene, each said grommet having a circular central opening therein and being adhesively fastened to at least one surface of said flexible sheet material such that the circular opening of the grommet is in superimposed alignment with respectively one of said apertures in said sheet material.

2. A tarpaulin as claimed in claim 1, wherein each said aperture in said sheet material comprises a circular hole of about 1½ inches in diameter, each said grommet having an outer diameter of about 3 inches, the central opening being about 1½ inches in diameter, and a thickness of about 1/16 inch.

3. A tarpaulin as claimed in claim 1, wherein said grommets are adhesively fastened to said tarpaulin body portion by being heat-sealed to the surface thereof.

4. A tarpaulin as claimed in claim 1, wherein said tarpaulin body portion is substantially rectangular, said grommets being arranged proximate each of the corners of said body portion.

5. A tarpaulin as claimed in claim 1, wherein said tarpaulin body portion is substantially circular; and a plurality of said grommets being spaced along the circumference of said body portion.

* * * * *